US012750635B2

(12) United States Patent
Coïc

(10) Patent No.: US 12,750,635 B2
(45) Date of Patent: Sep. 29, 2026

(54) COUNTING DEVICE AND CORRESPONDING METHOD

(71) Applicant: INTERSEC, Paris la Defense Cedex (FR)

(72) Inventor: Jean-Marc Coïc, Paris la Defense Cedex (FR)

(73) Assignee: INTERSEC, Paris la Defense Cedex (FR)

( * ) Notice: Subject to any disclaimer, the term of this patent is extended or adjusted under 35 U.S.C. 154(b) by 310 days.

(21) Appl. No.: 18/579,160

(22) PCT Filed: Jul. 12, 2022

(86) PCT No.: PCT/FR2022/051404

§ 371 (c)(1),
(2) Date: Jan. 12, 2024

(87) PCT Pub. No.: WO2023/285765

PCT Pub. Date: Jan. 19, 2023

(65) Prior Publication Data

US 2024/0357315 A1 Oct. 24, 2024

(30) Foreign Application Priority Data

Jul. 13, 2021 (FR) ....................................... 2107585

(51) Int. Cl.
*H04W 4/021* (2018.01)

(52) U.S. Cl.
CPC .................................. *H04W 4/021* (2013.01)

(58) Field of Classification Search
CPC ..... G06F 21/6254; H04W 4/021; H04W 4/00; H04W 16/00; H04W 64/00; H04W 68/00; H04W 88/00
See application file for complete search history.

(56) References Cited

U.S. PATENT DOCUMENTS 9,807,809 B2 * 10/2017 Van Phan ............. H04W 4/021
2017/0245240 A1 * 8/2017 Kim ...................... H04W 48/16
(Continued)

FOREIGN PATENT DOCUMENTS

CN 104217244 A 12/2014

OTHER PUBLICATIONS

Search Report issued in corresponding International Patent Application No. PCT/FR2022/051404 on Oct. 12, 2022, consisting of 5 pp. (English Translation Provided).
(Continued)

*Primary Examiner* — Timothy X Pham
(74) *Attorney, Agent, or Firm* — Volpe Koenig

(57) ABSTRACT

A counting device comprises a memory (4) designed to receive a set of data in relation to geographical areas together forming a grid of a geographical space, mobile telephony location cell data associating a location cell identifier, a location cell position and a location cell geographical coverage, an anonymizer (6) designed to determine, for a given location cell, one or more geographical areas overlapping the geographical coverage of the given location cell, and to compute a detection quantum for each geographical area, and a counter (8) designed to receive mobile telephony signalling data associating, each time, a mobile telephony identifier, a location cell identifier and a time marker, and to determine, for a given time range, a count of mobile telephony devices for each geographical area based on the mobile telephony signalling data and the one or more detection quantums associated with each geographical area.

12 Claims, 2 Drawing Sheets

(56) References Cited

U.S. PATENT DOCUMENTS

| | | | | |
|---|---|---|---|---|
| 2020/0084574 | A1* | 3/2020 | Kwon .................. | H04W 4/021 |
| 2021/0329586 | A1* | 10/2021 | Opshaug ............... | H04W 64/00 |

OTHER PUBLICATIONS

Written Opinion issued in corresponding International Patent Application No. PCT/FR2022/051404 on Oct. 12, 2022, consisting of 2 pp.

* cited by examiner

[Fig.1]
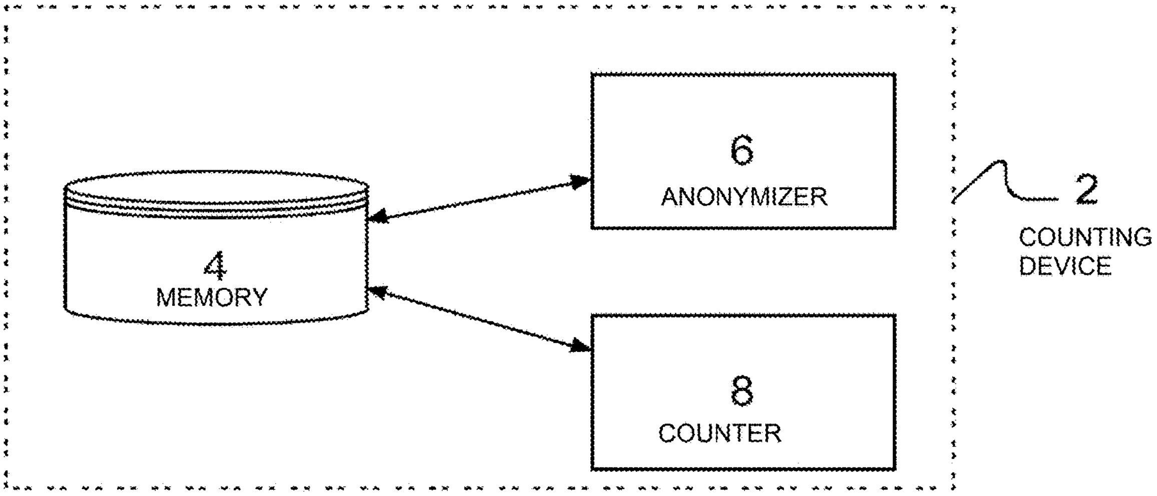
[Fig.2]
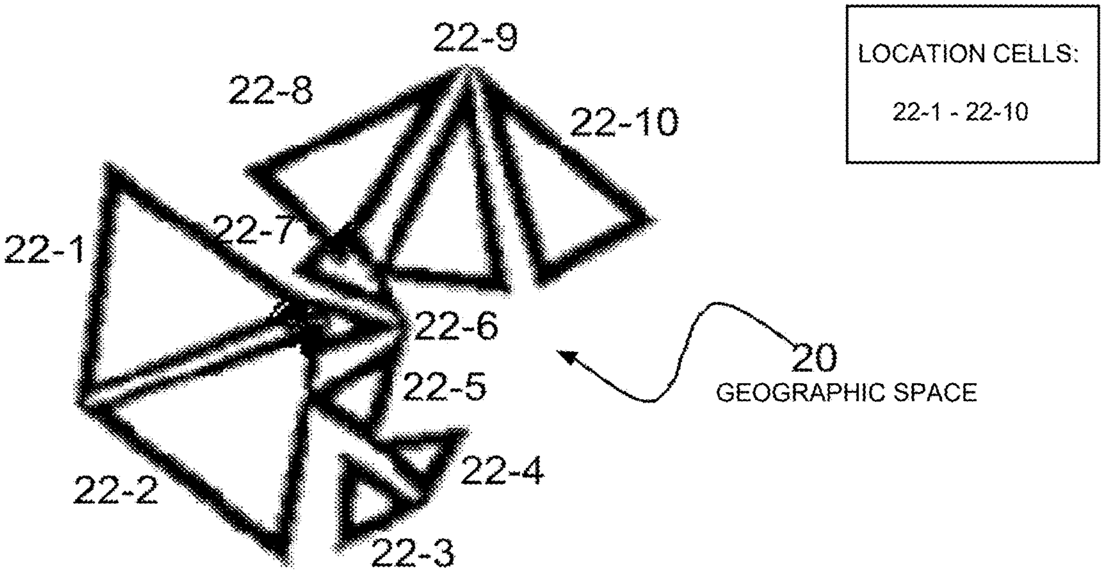

[Fig.3]
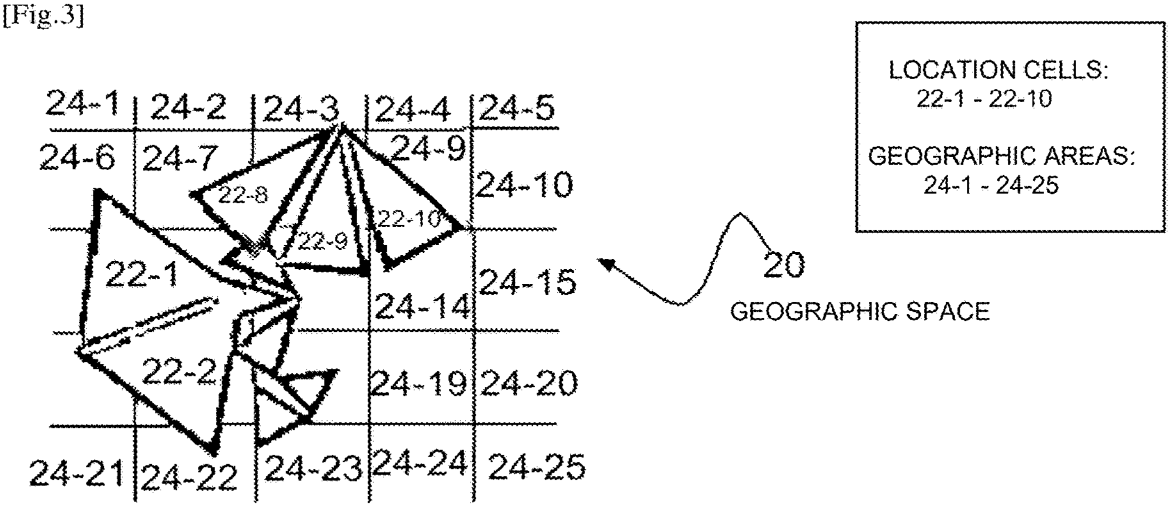
[Fig.4]
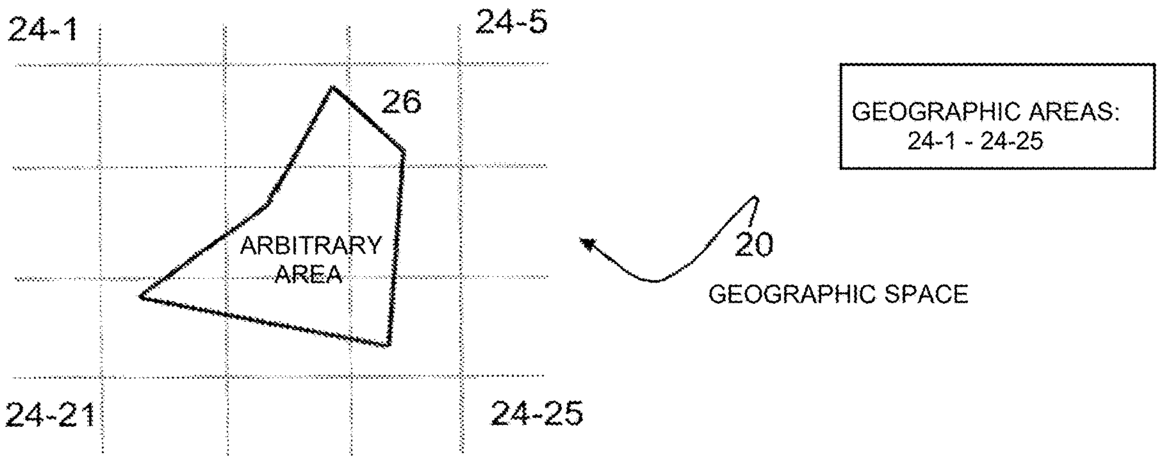
[Fig.5]
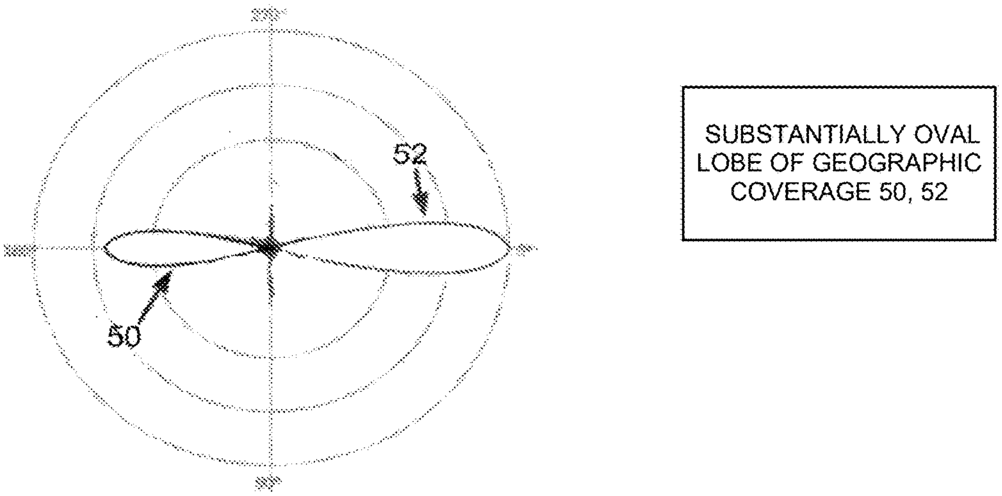

COUNTING DEVICE AND CORRESPONDING METHOD

FIELD OF THE INVENTION

The invention relates to the field of mobile telecommunications, and more particularly the need to be able to analyze the presence of people in predetermined areas while preserving their anonymity.

BACKGROUND

Indeed, in the context of alerts to populations in the event of serious and minor incidents, the public authorities firstly want to communicate with populations to warn of a danger and communicate the instructions to follow. This communication may take place by means of various communication channels, on cellphones for example.

When this communication requires leaving a danger zone, the authorities do not have visibility over the effects of the alert communication. One of the objects of the invention is to make it possible for the authorities to monitor population movements to assess the impact of an alert and possibly decide on additional actions.

In the context of alerts to populations, the authorities have a central platform for controlling the alerts. This platform is typically connected to various platforms with each operator in order to carry out communications and population head-count computations. This makes it possible to preserve the privacy of the subscribers of each network, since the central platform does not know the individual positions of the subscribers: it simply gives message broadcasting orders by transmitting a message and a targeted area, and the platforms with the operators are responsible for identifying the cellphones concerned and for sending the communications to these cellphones.

This need may also be felt in the event of attack type crisis situations, to benefit from estimations on the number of people actually in a given place. In another context, that of geolocated publicity, the invention makes it possible to anticipate the effects of a targeted communication in a given area, in order to provide means for extending or reducing the targeted area to adapt to objectives or to a budget.

In all these cases, it is not necessary to know the explicit list of people present in a given place, but only their approximate number.

The only solutions known for addressing this type of problem is based on the use of a k-anonymity method. This is for example the case of the patent application US20150007341A1 that applies this anonymization method to on-demand location services. However, this approach cannot be transposed to the anonymization of location event flows. The document CN 104 217 244 describes a device according to the preamble of claim 1.

SUMMARY

The invention improves the situation. To this end, it proposes a counting device comprising a memory arranged to receive a set of data in relation to geographical areas together forming a grid of a geographical space, mobile telephony location cell data associating a location cell identifier, a location cell position and a location cell geographical coverage, an anonymizer arranged to determine, for a given location cell, one or more geographical areas overlapping the geographical coverage of the given location cell, and to compute a detection quantum for each geographical area, and a counter arranged to receive mobile telephony signaling data associating, each time, a mobile telephony identifier, a location cell identifier and a time marker, and to determine, for a given time range, a count of mobile telephony devices for each geographical area based on the mobile telephony signaling data and the one or more detection quantums associated with each geographical area. The anonymizer is arranged to modify the geographical coverage of each given location cell by determining an effective radius based on the density of location cells around the given location cell.

This device is particularly advantageous because it makes it possible to obtain a sufficiently accurate localized count while respecting a framework given by the strictest privacy protection guidelines.

According to various embodiments, the invention may have one or more of the following features:

- the anonymizer is arranged, for a given location cell, to associate a detection quantum equal to 1 with a geographical area that contains the antenna of the location cell, or that contains the estimated barycenter of the geographical coverage of the location cell weighted by the transmission power, and a detection quantum equal to 0 for the other geographical areas.
- the anonymizer is arranged, for a given location cell, to determine a respective ratio between an overlapping surface between each respective geographical area and the geographical coverage of the given location cell and the surface of the geographical coverage of the given location cell, and to assign to each respective geographical area a detection quantum equal to the respective ratio.
- the anonymizer is arranged, for a given location cell, to modify the geographical coverage in the form of a main substantially oval lobe and of a secondary substantially oval lobe, both having one end at the antenna of the location cell and being substantially symmetrical in relation to a main emission axis of this antenna, and such that the main lobe is disposed on the main emission side of this antenna and is larger than the secondary lobe, to determine a respective ratio between an overlapping surface between each respective geographical area and the modified geographical coverage and the surface of the modified geographical coverage, and to assign to each respective geographical area a detection quantum equal to the respective ratio.
- the anonymizer is arranged, for a given location cell, to determine the detection quantum of each respective geographical area based on one or more probabilistic presence distributions characterizing the distance and/or the angle of the respective geographical area in relation to the geographical coverage of the given location cell,
- the anonymizer is arranged to determine two Gaussians, each according to a respective axis of the geographical space and with parameters depending on the geographical coverage of the given location cell, and to determine the detection quantum of each respective geographical area by determining calculating the product of these Gaussians applied with the coordinates of the center of each respective geographical area,
- the anonymizer is arranged to determine two Gaussians, each according to a respective axis of the geographical space and with parameters depending on the geographical coverage of the given location cell, and to determine the detection quantum of each respective geographical area by determining calculating the product of the integral of these Gaussians on the portion of each respective geographical area overlapping the geographical coverage of the given location cell.

the anonymizer is arranged to determine a Gaussian with parameters depending on the geographical coverage of the given location cell, and to determine the detection quantum of each respective geographical area by computing the value of the Gaussian with the distance between the center of each respective geographical area and the antenna of the given location cell, and by normalizing the resulting detection quantums so that their sum is 1.

the counter is arranged to determine a count value for each geographical area based on the sum, for each location cell the geographical coverage of which overlaps this geographical area, of the product of the detection quantum of this geographical area for this location cell by the number of unique mobile telephony device identifiers in this given location cell over a chosen time period.

The invention also relates to a counting method comprising: a) receiving a set of data in relation to geographical areas together forming a grid of a geographical space, mobile telephony location cell data associating a location cell identifier, a location cell position and a location cell geographical coverage, and determining for a given location cell, one or more geographical areas overlapping the geographical coverage of the given location cell, the geographical coverage of each given location cell being modified by determining an effective radius based on the density of location cells around the given location cell, and to compute a detection quantum for each geographical area, b) receiving mobile telephony signaling data associating, each time, a mobile telephony identifier, a location cell identifier and a time marker, and to determine, for a given time range, a count of mobile telephony devices for each geographical area based on the mobile telephony signaling data and the one or more detection quantums associated with each geographical area.

According to various alternative embodiments, this method may include one or more of the following features:

the operation a) comprises determining a respective ratio between an overlapping surface between each respective geographical area and the geographical coverage of the given location cell and the surface of the geographical coverage of the given location cell, and assigning to each respective geographical area a detection quantum equal to the respective ratio.

the operation a) comprises modifying the geographical coverage in the form of a main substantially oval lobe and of a secondary substantially oval lobe, both having one end at the antenna of the location cell and being substantially symmetrical in relation to a main emission axis of this antenna, and such that the main lobe is disposed on the main emission side of this antenna and is larger than the secondary lobe, to determine a respective ratio between an overlapping surface between each respective geographical area and the modified geographical coverage and the surface of the modified geographical coverage, and assigning to each respective geographical area a detection quantum equal to the respective ratio.

the operation a) comprises determining the detection quantum of each respective geographical area based on one or more probabilistic presence distributions characterizing the distance and/or the angle of the respective geographical area in relation to the geographical coverage of the given location cell. Finally, the invention relates to a program comprising instructions for implementing the device according to the invention or for executing the method according to the invention when said computer program is run by a computer.

BRIEF DESCRIPTION OF THE DRAWINGS

Other features and advantages of the invention will become more apparent upon reading the following description, taken from non-limiting examples given for illustrative purposes, taken from drawings wherein:

FIG. 1 shows a generic diagram of a device according to the invention.

FIG. 2 shows an example of location cells implemented by the device of FIG. 1, FIG. 3 shows an example of geographical areas implemented by the device of FIG. 1, FIG. 4 shows a geofencing implemented by the device of FIG. 1, and FIG. 5 shows an example of modeling of a location cell.

DETAILED DESCRIPTION OF THE PREFERRED EMBODIMENTS

The drawings and the description hereinafter contain, for the most part, elements of a certain character. Therefore, not only may they be used to better understand the present invention, but also to contribute to its definition, if applicable.

FIG. 1 shows a generic diagram of a device 2 according to the invention. The device 2 comprises a memory 4, an anonymizer 6 and a counter 8.

The overall philosophy of the invention is the following. To be able to count on the basis of a geofencing anonymously, it is possible to use the signaling data of mobile telephony devices. Indeed, each device regularly communicates with antennas in order to be connected to the network. These antennas have a geographical range known by operators, and signaling data indicating that a given device communicates with a given antenna therefore making it possible to locate it in this cell. The coverage of an antenna is also known under the term, location cell. However, it is not desirable to use these data, because they fully identify people by their mobile telephony device identifier. The Applicant therefore had the idea of crossing the geographical coverage of the location cells with an arbitrary geographical grid. Thus, it becomes possible to anonymize the count, since it will be sought to determine the number of mobile devices in one or more geographical areas of this grid.

In order to preserve an accurate count, it is therefore necessary to establish a correspondence between each location cell and the geographical area(s) that its geographical coverage overlaps. For example, FIG. 2 shows an example of embodiment wherein a geographical space 20 that the device 2 aims to monitor is covered by 10 distinct location cells referenced 22-1 to 22-10.

As explained above, the device 2 initially associates the location cells 22-1 to 22-10 with a grid of the geographical space 20 with geographical areas referenced 24-1 to 24-25. In the example shown in FIG. 3, this grid is in the form of a square-mesh grid, but it goes without saying that many other grids may be envisaged, for example by using the municipalities or otherwise.

Thus, by way of example, the cell 22-1 overlaps the geographical areas 24-6, 24-7, 24-11, 24-12 and 24-16. This means that, when signaling data associate a mobile telephony device with the location cell 22-1, the latter is likely to be in one of the geographical areas 24-6, 24-7, 24-11, 24-12 and 24-16.

To reflect this probability, the invention proposes to assign a detection quantum to each geographical area that is overlapped by the geographical coverage of a given location cell. Thus, it becomes possible to ignore the identifiers of mobile devices and to count the single events in a given location cell, and to propagate this count to each overlapping geographical area by its detection quantum.

Thus, it is possible to end up with numbers between 0 and 1 for the count even after adding up the contribution of each location cell on a given geographical area. But this is not a problem because it is subsequently necessary to optionally add the account of all the operators, then correct the determined count. Thus, it will be possible to use a cellphone penetration factor and a turn off factor, for example, 110% of cellphone penetration, but 95% of the phones on permanently. Alternatively, these factors may vary depending on each geographical area, in order to take into account the fact that the cellphone penetration varies over the territory.

Subsequently, as shown in FIG. 4, it becomes possible to plot and arbitrary area 26 over the geographical space 20, and the count will be determined by computing the coverage of this geofencing with each geographical area and by adding up the counts of each geographical area weighted by this coverage.

Here again, other techniques may be used for the count with geofencing, depending on the grid type and on other specific features. For example, if it is known that a given geographical area comprises a corridor, and that people cannot be anywhere other than in this corridor, then the coverage may be considered as complete for this geographical area, even if this is not the case from a strictly geographical point of view.

It appears that it will be advantageous to choose a grid the resolution of which is detailed enough to conserve a good accuracy during the estimation of the headcount on a geofencing. Likewise, the size of the geographical areas will preferably be adapted to the geographical coverage of the location cells in order to conserve a sufficient accuracy over each geographical area.

It is also possible to define a plurality of grids in order to adapt the resolution depending on the real population density: for example, have a 200 m×200 m grid over Paris, but only 1,000 m×1,000 m in rural areas. To facilitate the passage from one grid to another, it will be useful to align the grids. For example, the 200 m×200 m grid may be arranged to correspond to a re-division of the boxes of the grid in 1,000 m×1,000 m covering Paris. Thus, it appears that the memory 4 receives all the data necessary for operating the device 2, regardless of whether they are temporary or not. Thus, the memory 4 receives the data defining the geographical areas, that is to say the information making it possible to define them in the geographical space (for example, with the coordinates of the North-West corner, and the side of the square for a square-mesh grid, etc.) and to identify each geographical area. Similarly, the memory 4 receives the data relating to the location cells, which typically comprise a location cell identifier and a location cell geographical coverage (there again, the coverage may be defined in many ways, this involves positioning in an absolute way the location cell and its signal coverage in the geographical space concerned). Alternatively, the location cell data may comprise one or more data mentioned below to compute the detection quantums. Obviously, the memory 4 also receives the detection quantums that associate a given location cell and a given geographical area. The memory 4 also receives all the temporary data, as well as the input data formed by the mobile telephony signaling data, as well as the count data by geographical area that result therefrom. Finally, the memory 4 may also receive geofencing data defining an arbitrary area of the geographical space used in conjunction with the count of the geographical areas to determine a count for a specific area.

The data received by the memory 4 may advantageously be time-stamped, so that the counts can be monitored over time. This makes it possible to display the count data in real time, and at arbitrary dates and times in the past. Therefore, it is advantageous to store in the memory 4 the last known count in a different database to be able to easily query the last known state.

The historical counts also make it possible to compute the average counts per box over the last 6 weeks (by taking the value of the same week day over the same time slot). It goes without saying that the duration of this history may vary and be brought to a few days or on the contrary a plurality of months. This makes it possible to show the information that differs with the normal in addition to the "raw" count. This difference to the normal makes it possible to rapidly view the ongoing situations, in areas with counts that are much higher or much higher than usual on the same day with the same time slot. To compute the cellphone average, it is useful to delete the minimum and maximum values to avoid counting the influence of one-off events.

In the example described here, the memory 4 is described as a single element, but it may be distributed over a plurality of elements. It may be performed by any type of data storage specific to receiving digital data: hard drive, solid state drive (SSD), flash memory in any form, random access memory, magnetic disc, locally distributed storage or in the cloud, etc. The data computed by the device may be stored on any type of memory similar to the memory 4, or on the latter. These data may be erased after the device has carried out its tasks or conserved.

The anonymizer 6 and the counter 8 are elements that directly or indirectly access the memory 4. They may be produced in the form of an appropriate computer code or program run by one or more processors. Processors must be understood as any processor adapted to computing projections of textures on plans and processing related to voxels. Such a processor may be produced in any known way, in the form of a microprocessor for personal computer, of an FPGA or SoC (System on chip) type dedicated chip, of a resource for computing on a grid or in a cloud, of a microcontroller, or of any other form specific to providing the computing power necessary for the embodiment described below. One or more of these elements may also be produced in the form of specialized electronic circuits such as an ASIC. A combination of processor and of electronic circuits may also be envisaged.

The anonymizer 6 has the function of determining detection quantums for each location cell. When the geographical coverage of a location cell is completely contained in a geographical area, then the detection quantum of this geographical area is set at 1.

For the case where the geographical coverage of a location cell has an overlap with a plurality of geographical areas, the work of the Applicant demonstrated to them that a plurality of solutions may be used to determine the detection quantums.

The first solution consists in associating a detection quantum equal to 1 for a single geographical area, and 0 for all others. The geographical area may be chosen as that which contains the antenna of the location cell, or alternatively the geographical area that contains the estimated barycenter of the coverage of the antenna of the location cell. This first solution is a simplistic approach that does not give the best results.

A second solution consists in determining, for each geographical area, what is the overlap rate with the geographical coverage in relation to the latter, and to assign this ratio as detection quantum. Alternatively, as shown in FIG. 5, the geographical coverage of the location cell may be modified to take the form of a main substantially oval lobe 52 and of a secondary substantially oval lobe 50, both having one end at the antenna of the location cell and being substantially symmetrical in relation to a main emission axis of this antenna, and such that the main lobe is disposed on the main emission side of this antenna and is larger than the secondary lobe. This solution is more realistic in the sense that it shows a little more accurately the real coverage of each location cell.

A third solution consists in defining the detection quantum depending on a probabilistic presence distribution, for example by using one or more Gaussian functions that may depend on the distance of the cell and/or on the angle in relation to the orientation of the cell. Alternatively, the Gaussian functions may be replaced with functions taken from the Gamma distribution. Generally, any function associated with a distribution resembling a presence probability may find an application.

According to a first alternative embodiment, the detection quantum is determined at the center of each geographical area up to a certain distance (typically the radius of the location cell, or a portion thereof, for example 75%), and the count is assigned depending on the relative weight of each box covered. For example, the detection quantum may be determined by the product of two Gaussians, each according to an axis of the geographical space, the parameters of these Gaussians depending on each location cell.

According to a second simpler alternative embodiment, the detection quantum is determined on the basis of a single Gaussian, only depending on the distance between the center of the geographical area and the antenna of the location cell, the detection quantums being normalized so that their sum is 1.

According to a third more accurate alternative embodiment, the detection quantum is determined based on the integral over each geographical area of two Gaussians, each according to an axis of the geographical space, the parameters of these Gaussians depending on each location cell.

The anonymizer 6 may also modify the geographical coverage of each location cell to take into account the reasonable hypothesis that a mobile telephony device as a priority connects on the closest location cells. Thus, an effective radius should be defined that is proportional to the inverse of the square root of the density of location cells. This density may be estimated iteratively, starting from a small surface centered on the cell, then by extending this surface incrementally up to finding a chosen number of location cells overlapping this surface or until a surface boundary is reached. In this example, the density is at each iteration proportional to the inverse of the surface, and the density retained is that of the last iteration. Alternatively, still, the density may also take into account the digital opening of the antennas of the location cells taken into account for the surface.

Once the detection quantums have been determined by the anonymizer 6, the counter 8 can operate by adding up, over a chosen time period, all the detection quantums of each pair (geographical area; location cell) respectively multiplied by the number of mobile device unique identifiers in each location cell during this time period. Thus, if a given geographical area has a coverage with four distinct location cells, it is the sum of the four products of the detection quantum for each respective location cell by the number of unique identifiers of the respective location cell that gives the count for this geographical area.

Subsequently, the counter 8 may optionally and preferably execute a correction, by adding up the counts of all the operators covering a given geographical area, and by applying a cellphone penetration factor and a turn off factor, for example, 110% of cellphone penetration, but 95% of phones on permanently.

Finally, if a geofencing has been drawn on the grid of the geographical areas, the final count can be computed by applying to the count of each geographical area a coverage rate with this geofencing. This rate may optionally depend on geographical parameters specific to each geographical area, which for example may lead to setting a rate at 1 even if the overlap is partial, or on the contrary lowering it despite a significant overlap.

The invention claimed is:

1. A counting device comprising:

a memory coupled with processing components and configured to receive:

a set of data in relation to geographical areas that together forms a grid of a geographical space, and mobile telephony location cell data associating a location cell identifier, a location cell position and a location cell geographical coverage, and the processing components including:

an anonymizer configured to determine, for a given location cell, one or more geographical areas overlapping the geographical coverage of the given location cell, and to compute a detection value for each geographical area, and a counter configured to receive mobile telephony signaling data associating, each time, a mobile telephony identifier, a location cell identifier and a time marker, and to determine, for a given time range, a count of mobile telephony devices for each geographical area based on the mobile telephony signaling data and the one or more detection values associated with each geographical area, wherein the anonymizer is configured:

to modify the geographical coverage of each given location cell by determining an effective radius based on a density of location cells around the given location cell, for a given location cell, to modify the geographical coverage in the form of a main substantially oval lobe and of a secondary substantially oval lobe, both having one end at the antenna of the location cell and being substantially symmetrical in relation to a main emission axis of this antenna, and such that the main lobe is disposed on the main emission side of this antenna and is larger than the secondary lobe, to determine a respective ratio between an overlapping surface between each respective geographical area and the modified geographical coverage and the surface of the modified geographical coverage, and to assign to each respective geographical area a detection value equal to the respective ratio.

2. The counting device according to claim 1 wherein the anonymizer is configured, for a given location cell, to associate a detection value equal to 1 with a geographical area that contains the antenna of the location cell, or that contains an estimated barycenter of the geographical coverage of the location cell weighted by transmission power, and a detection value equal to 0 for the other geographical areas.

3. The counting device according to claim 1 wherein the anonymizer is configured, for a given location cell, to determine a respective ratio between an overlapping surface between each respective geographical area and the geographical coverage of the given location cell and the surface of the geographical coverage of the given location cell, and to assign to each respective geographical area a detection value equal to the respective ratio.

4. The counting device according to claim 1 wherein the anonymizer is configured, for a given location cell, to determine the detection value of each respective geographical area based on one or more probabilistic presence distributions characterizing a distance and/or an angle of the respective geographical area in relation to the geographical coverage of the given location cell.

5. The counting device according to claim 4, wherein the anonymizer is configured to determine two Gaussians, each according to a respective axis of the geographical space and with parameters depending on the geographical coverage of the given location cell, and to determine the detection value of each respective geographical area by calculating the product of said Gaussians applied with coordinates of the center of each respective geographical area.

6. The counting device according to claim 4, wherein the anonymizer is configured to determine two Gaussians, each according to a respective axis of the geographical space and with parameters depending on the geographical coverage of the given location cell, and to determine the detection value of each respective geographical area by calculating the product of all of said Gaussians on the portion of each respective geographical area overlapping the geographical coverage of the given location cell.

7. The counting device according to claim 4, wherein the anonymizer is configured to determine a Gaussian with parameters depending on the geographical coverage of the given location cell, and to determine the detection value of each respective geographical area by computing the value of the Gaussian with the distance between the center of each respective geographical area and the antenna of the given location cell, and by normalizing the resulting detection values so that their sum is 1.

8. The counting device according to claim 1, wherein the counter is configured to determine a count value for each geographical area based on the sum, for each location cell the geographical coverage of which overlaps said geographical area, of the product of the detection value of this geographical area for this location cell by the number of unique mobile telephony device identifiers in said given location cell over a chosen time period.

9. A counting method comprising:

receiving in a memory that is coupled with processing components:

a set of data in relation to geographical areas that together forms a grid of a geographical space, mobile telephony location cell data associating a location cell identifier, a location cell position and a location cell geographical coverage, and using an anonymizer of the processing components to determine for a given location cell, one or more geographical areas overlapping the geographical coverage of the given location cell, the geographical coverage of each given location cell being modified by determining an effective radius based on a density of location cells around the given location cell, and to compute a detection value for each geographical area, using a counter of the processing components to receive mobile telephony signaling data associating, each time, a mobile telephony identifier, a location cell identifier and a time marker, and to determine, for a given time range, a count of mobile telephony devices for each geographical area based on the mobile telephony signaling data and the one or more detection values associated with each geographical area, and using the anonymizer to:

modify the geographical coverage in the form of a main substantially oval lobe and of a secondary substantially oval lobe, both having one end at the antenna of the location cell and being substantially symmetrical in relation to a main emission axis of this antenna, such that the main lobe is disposed on the main emission side of said antenna and is larger than the secondary lobe, to determine a respective ratio between an overlapping surface between each respective geographical area and the modified geographical coverage and the surface of the modified geographical coverage, and to assign to each respective geographical area a detection value equal to the respective ratio.

10. The counting method according to claim 9 further comprising:

using the anonymizer to determine a respective ratio between an overlapping surface between each respective geographical area and the geographical coverage of the given location cell and the surface of the geographical coverage of the given location cell, and to assign to each respective geographical area a detection value equal to the respective ratio.

11. The counting method according to claim 9 further comprising:

using the anonymizer to determine the detection value of each respective geographical area based on one or more probabilistic presence distributions characterizing a distance and/or an angle of the respective geographical area in relation to the geographical coverage of the given location cell.

12. A program comprising instructions for implementing the method according to claim 9, when said computer program is run by a computer.

* * * * *